Figure 1:
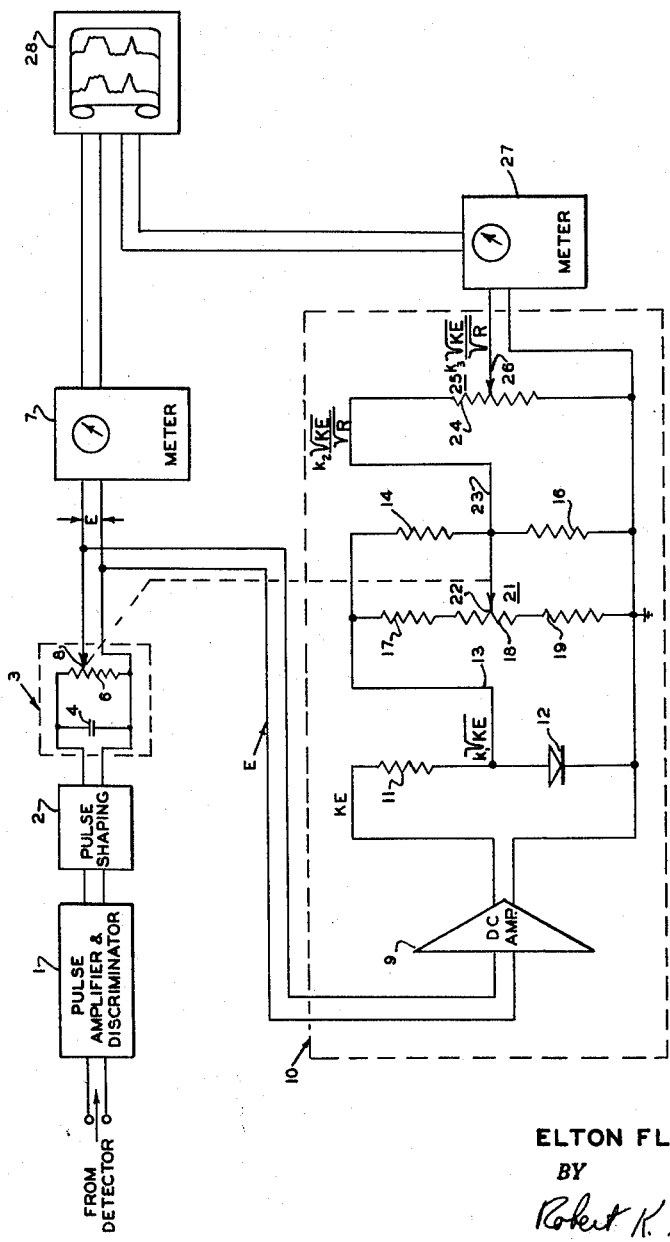

Jan. 8, 1963

E. F. N. HARPER 3,072,335

ANALOG COMPUTER FOR DETERMINING CONFIDENCE LIMITS OF MEASUREMENT

Filed Jan. 14, 1959

2 Sheets-Sheet 1

INVENTOR.
ELTON FLOYD NEIL HARPER
BY
Robert K. Schumacher
ATTORNEY

Jan. 8, 1963　　　　　E. F. N. HARPER　　　　　3,072,335
　　　　　ANALOG COMPUTER FOR DETERMINING CONFIDENCE
　　　　　　　　　　　LIMITS OF MEASUREMENT
Filed Jan. 14, 1959　　　　　　　　　　　　　　2 Sheets-Sheet 2
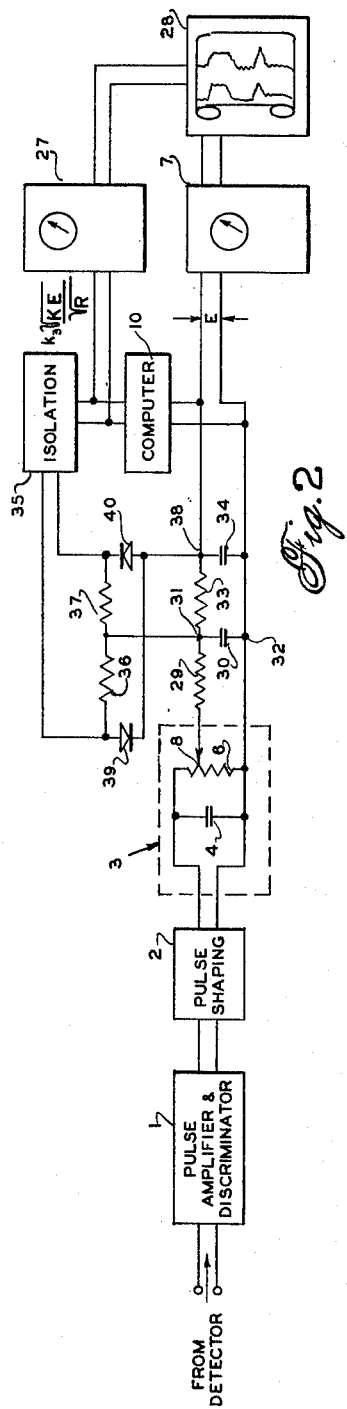
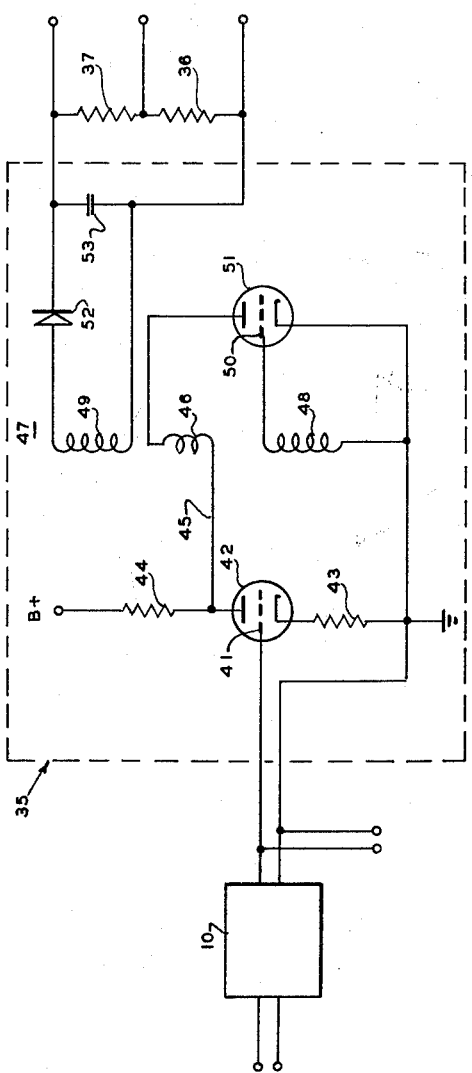
*INVENTOR.*
ELTON FLOYD NEIL HARPER
*BY*
ATTORNEY 3,072,335
Patented Jan. 8, 1963

3,072,335
ANALOG COMPUTER FOR DETERMINING CONFIDENCE LIMITS OF MEASUREMENT
Elton Floyd Neil Harper, Tulsa, Okla., assignor to Well Surveys, Incorporated, a corporation of Delaware
Filed Jan. 14, 1959, Ser. No. 786,732
7 Claims. (Cl. 235—193)

The present invention relates to computing circuits and more particularly to a circuit employed in conjunction with a variable range count rate meter for selectively computing one of the various confidence limits of measurements containing random error resulting primarily from statistical variations in the decay rates of radioactive materials. The apparatus of the present invention is applicable to all fields of investigation in which it is desired to determine the confidence limits of measurements containing random error but is described for purposes of example, as applied to the field of logging bore holes by techniques involving the measurement of radioactivity.

In the field of bore hole logging with which the present invention is particularly concerned, a radioactivity detector is passed through a bore hole in order to measure the natural or induced radioactivity of the formations surrounding the bore hole. The detector converts the emanations detected thereby to electric impulses whose rate of occurrence indicates the radioactivity of the surrounding stratum. The individual impulses are normally converted to an analog voltage indicative of counting rate and the magnitude of this voltage is recorded as a function of position of the detector in the bore hole to produce a well log. The well log thus produced provides a graphic illustration of the nature of the strata as a function of depth in the bore hole and is particularly useful in determining the location of interfaces between different strata and indicating the type of strata at various depths as determined by their natural or induced radioactivity. The interpretation of a well log of the type just described is tedious even for the trained observer since it is often difficult to distinguish between fluctuations resulting from changes in strata and those resulting from extraneous causes such as variation of the displacement of the detector from the walls of the bore hole, variations in thickness of an intervening mud cake, if present, and particularly as a result of statistical variations in the rate at which natural radiations or source produced radiations reach the detector from the strata.

The rate of decay of a radioactive substance, when considered over long periods of time, is uniform but varies over short periods due to the random nature of the disintegration process of such substances. Detection is similarly random. In general, measurements of the rates of decay of a substance, when each measurement is taken for a definite interval of time, vary from interval to interval but are grouped about an average value. For radioactive measurements the distribution of individual measurements about the average value is in accordance with Poisson's distribution law. The best estimate of the true decay rate is given by the average decay rate. If the average decay rate has been established by a series of measurements, the probability that a particular measurement or a particular set of measurements fall within set limits of this average value can be determined. A common method of stating the deviation from the average value is in terms of the standard deviation. For a Poisson distribution it can be shown that the standard deviation is the square root of the average decay rate. Further, it can be shown that the probability that a single measurement shall not depart from an established average value by more than one standard deviation is approximately 68.3%. One can therefore refer to an interval of one standard deviation on each side of the average value as the 68.3% confidence interval. Thus the limits set by one standard deviation on each side of the average value becomes the 68.3% confidence limits. It is common to use other measurements of the confidence limits. For example, one might speak of the 95% confidence limits. This means that a single observation made upon a decay rate which has already been established will have a 95% chance of falling within the 95% confidence limits.

In setting up the confidence limits which are to be met in a particular set of measurements, this selection must be made with due regard to information obtained from prior investigations in this particular field or environment. Having established confidence limits which are suitable, the investigator may consider any measurements falling within these confidence limits to result from the normal statistical fluctuations of the decay rate measurement. However, if a particular measurement falls outside of the selected confidence interval, it may be concluded that the quantity being measured, the rate of radioactive decay, has changed, increasing or decreasing as the measurement falls either above or below the limit set by the confidence interval.

In a practical system, the number of counts per unit of time is determined by producing an electric pulse, of fixed amplitude and duration, in response to each emanation detected by a Geiger-Muller or other appropriate radiation detector, and integrating the pulses with an RC integrating circuit. The voltage developed by the integrating circuit at any instant is therefore directly proportional to the number of counts per unit of time. A voltage analogous to the standard deviation may be readily obtained by developing a voltage directly proportional to the square root of the aforesaid voltage and dividing this second voltage by the square root of the ratio of counting rate to voltage developed in the integrating circuit, to develop a third voltage. This third voltage will then be proportional to the standard deviation.

$$E_{\text{S.D.}} = \frac{\sqrt{E}}{\sqrt{R}}$$

where:

$E_{\text{S.D.}}$ is a voltage proportional to the standard deviation (third voltage);
E is the voltage developed in the integrating circuit (first voltage); and
R is the ratio of the counting rate to E, and depends upon the sensitivity range selected.

By multiplying the third voltage, by an appropriate constant, a fourth voltage may be obtained proportional to a desired one of the other confidence limits. The original integrated voltage and the third or fourth voltage may be applied to pen or other appropriate recorders to provide logs of counting rate and standard deviation, or other desired confidence interval, side-by-side so as to facilitate interpretation of the counting rate log.

The system thus far described is straight forward but difficulties arise when it is desired to vary the sensitivity of the integrating circuit. In a system employing a fixed sensitivity, the range of counting rates that can be accepted by the system is limited to a relatively narrow range and where a capacitive element is employed to effect integration, the range is determined by the charging curve of the capacitor. If the sensitivity of the integrating circuit is variable, then the instrument may be provided with various range scales and the overall range of acceptable mounting rates greatly expanded. As an example: the circuit when employing one sensitivity range may develop 20 volts in response to 500 counts per second but may produce only 5 volts in response to the same number of counts when employing a lower sensitivity range. If the meter has a range of 20 volts, the change in range in the above example expands the range of the instrument from 500 to 2000 counts per second. Since both voltages in the example are intended to represent the same number of counts per second, the conversion factor from voltage to counts is different in the two cases and therefore in calculating standard deviation, which is a function of counts per unit time, the changing conversion factor must be taken into account. In a practical case, regardless of the variations in the integrated voltage with changes in range of the instrument, the voltage representative of standard deviation must remain constant so long as the counting rate is constant, since the standard deviation is a function of the counting rate and not of the voltage representative thereof. This enters as the ratio R above.

As previously indicated, the standard deviation is equal to the square root of the average number of counts per unit of time. In an electrical computer of the type with which the present invention is concerned the number of counts is determined by integrating the individual pulses representing emanations to be counted and extracting the square root of this voltage and dividing by the square root of the conversion factor R. So long as the sensitivity of the circuit is constant the conversion factor is a constant and may be incorporated in the calibration circuit of the recorder. However, where the sensitivity of the instrument is variable, the conversion factor must not only be variable but must be varied as a function of the change in sensitivity.

It is therefore an object of the present invention to provide a circuit for computing any one of various confidence intervals in a variable range counting rate meter.

It is another object of the present invention to provide a computing circuit for selectively computing one of various confidence intervals in variable range radiation counting rate meters which variations result primarily from statistical variations in the rate of detection of decay products of radioactive substances.

It is yet another object of the present invention to provide a computing circuit for computing standard deviation, or other confidence intervals related thereto by a constant factor, from a voltage proportional to the number of emanations per unit of time from a radioactive source.

It is still another object of the present invention to provide a circuit for computing the confidence intervals in a variable range radiation counting rate circuit wherein a factor for converting an output voltage from the counting rate meter to number of counts in variable as a function of the sensitivity of the counting rate meter.

It is another object of the present invention to provide a circuit for computing standard deviation and related confidence intervals in a variable sensitivity radiation counting rate circuit system which computing circuit comprises a relatively few number of simple and inexpensive circuit components.

It is still another object of the present invention to provide a circuit for computing standard deviation and related confidence intervals which circuit derives the various confidence limits from a voltage proportional to counting rate per unit time as derived from a variable range counting rate meter.

It is still another object of this invention to provide for automatic switching of time constants whenever the rate of occurrence of the detected events varies from its recent average to exceed a selected confidence limit.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic wiring diagram of a circuit of the present invention;

FIGURE 2 is a schematic diagram of an application of the computer of FIG. 1 to automatic switching of time constants; and FIGURE 3 is a schematic diagram of the isolation circuit of FIGURE 2.

Referring now to FIGURE 1 of the accompanying drawings, pulses developed by a Geiger-Muller tube or other appropriate radiation detector are applied to a pulse amplifier and amplitude discriminator 1 which amplifies only those incoming pulses that are above a predetermined threshold of response of the amplifying circuit. Thus, the circuit element 1 discriminates against pulses below a predetermined amplitude and amplifies all pulses lying above the discriminator or threshold level. Output pulses developed by the circuit element 1 are applied to a pulse-shaping circuit 2 which produces square wave pulses having a fixed duration and amplitude so that all pulses derived from the circuit 2 have the same energy content. The pulses produced by the pulse-shaping circuit 2 are applied to a variable sensitivity integrating network 3 comprising a capacitor 4 connected in parallel with a resistor 6. The value of the resistor 6 determines the degree of discharge of the capacitor 4 in the interval between succeeding pulses and therefore determines the voltage E developed across the capacitor 4 in response to pulses of a predetermined frequency or counting rate. More specifically, since all of the pulses produced by the circuit element 2 have the same energy content, each pulse supplied to the capacitor 4 produces a predetermined incremental increase in the voltage stored in the capacitor 4. However, between each pulse applied to the integrating circuit 3, a predetermined portion of the charge on the capacitor leaks off through the resistor 6 and the amount of leakage is determined by the time constant of the circuit. A part E of the voltage developed across the capacitor 4 is applied to a meter 7 which is calibrated in total number of counts per unit of time, usually a minute or a second. In order to change the range of the instrument and therefore to permit a single instrument to measure widely different counting rates, the resistor 6 is a potentiometer so that any desired counting rate may produce a full scale voltmeter reading. If the counting rate is high, it may be desirable to adjust the slidewire 8 of the resistor 6 such that 500 counts per second produces full scale deflection of the meter 7; whereas when the counting rate is low, it may be desired that 250 counts per second produce a full-scale deflection of meter 7. This is done, without changing the time constant of the integrating circuit, by adjustment of the slidewire connection 8 to pick-off a larger portion of the capacitor voltage in the second case.

The foregoing is a description of a multirange counting rate meter, calibrated in events per unit time, for example, counts per second, that develops an output voltage proportional to the counts per unit time.

The output of a counting rate meter is a voltage proportional to a rate, for example, counts per second, which is an arbitrary calibration and is not related to the time constant of the integrating circuit. The same counting rate meter could also be calibrated in counts per minute or counts per hour by changing only the numbers on the voltmeter.

As previously stated, the standard deviation is the square root of the number of counts in a unit of time. The unit of time on which the standard deviation is based is arbitrary and must be chosen when the incoming information is in the form of a rate, as in the present case. This interval time is not related to the time constant of the integrating circuit developing the voltage proportional to rate. For example, if the counting rate meter is calibrated in counts per minute and the integrating circuit develops 5 volts for 10,000 counts per minute input, the 5 volts also represents 166.6 counts per second. The standard deviation can be calculated on a basis of 1 minute $$(\sqrt{10{,}000}=100)$$

or 1 second ($\sqrt{166.6}=12.9$). If a computer is to work from this input, a time must be chosen for a basis of standard deviation computation. The choice depends on the use of the computer and the present example is based on 1 second.

If the integrating circuit 3 has a fixed sensitivity, then the value of the voltage E, applied to the meter 7, is related by a fixed conversion factor to the number of pulses applied to the circuit. Under these circumstances, standard deviation could be determined by taking the square root of the voltage E and dividing it by a predetermined constant. However, where the sensitivity of the integrator circuit 3 is variable, the conversion factor between the voltage E and the number of counts per time constant is varied with any change in the sensitivity, the latter factor being the independent variable. Therefore in a circuit which automatically produces a voltage proportional to standard deviation, the extent of variation of the counting rate per volt conversion factor with variation in sensitivity of the integrating circuit must be taken into account.

In accordance with the present invention the standard deviation is determined by taking the square root of the voltage E and dividing it by the square root of the conversion factor of counting rate per volt; that is, the square root of the voltage applied to the meter 7 is divided by a number which represents the square root of a conversion factor R of counting rate per volt. For example, if the sensitivity range of the integrating circuit is set to develop 5 volts with an input of 10,000 counts per minute and the standard deviation is based on 1 second, the number of counts in 1 second is 166.6. The counting rate per volt conversion factor R is then $$R=\frac{166.6}{5}=33.33$$

In a practical embodiment of the circuit, a voltage proportional to the standard deviation is derived in a three stage process comprising the generation of a voltage proportional to the number of pulses per unit of time, the voltage E; taking the square root of the voltage E and dividing it by the square root of the conversion factor R.

The above operation is expressed by the above equation. Using the above example in which the sensitivity range of the integrating circuit is set to develop 5 volts with an input of 166.66 counts per second, the voltage proportional to the standard deviation is, at 166.66 counts per second:

$$E_{\text{S.D.}}=\frac{\sqrt{E}}{\sqrt{R}}=\frac{\sqrt{5}}{\sqrt{33.33}}=\frac{2.239}{5.77}=.386 \text{ volts}$$

The standard deviation in counts for 166.66 counts is $\sqrt{166.66}=12.9$ counts per second. This is equal to $RE_{\text{S.D.}}$;

For a counting rate of 2500 counts per minute, 41.66 counts per second, at the same sensitivity, E is 1.25 volts. Under these conditions $$E_{\text{S.D.}}=\frac{\sqrt{1.25}}{\sqrt{33.33}}=.193 \text{ volts}$$

The standard deviation being $RE_{\text{S.D.}}=\sqrt{41.66}=6.45$ counts per second.

Referring again to FIGURE 1 of the accompanying drawings, the voltage applied to the meter 7 is also applied to a D.C. amplifier 9 of a computer 10. Amplifier 9 has gain K and therefore multiplies the voltage E by the factor K for purposes to be described subsequently. An output voltage E times K is derived from the amplifier 9 and applied across a resistor 11 and a diode 12 connected in series. The series connected resistor 11 and diode 12 constitute a well-known square root taking device. The resistance of resistor 11 and the gain K of amplifier 9 are selected so that diode 12 is operated in a well known manner in that portion of its operating characteristic that makes the voltage at the junction of the resistor 11 and diode 12 proportional to the square root of KE. The voltage $k_1\sqrt{KE}$ ($k_1$ being a proportionality constant) appears on a lead 13, which is connected to the aforesaid junction and is applied to the upper end of a resistor 14, the lower end of which is connected through a resistor 16 to the lower end of the diode 12, all as illustrated in FIGURE 1 of the accompanying drawings. The lower end of the resistor 16 and also the diode 12 may be connected to ground potential, for purposes of illustration. The resistors 14 and 16 are shunted by series resistors 17, 18, and 19 with the resistor 18 being disposed between resistors 17 and 19 and constituting a resistive element of a potentiometer 21. The potentiometer 21 is further provided with a variable tap 22 electrically connected to the junction of resistors 14 and 16 and to a lead 23. The lead 23 is connected through a further resistor 24 to ground. The resistor 24 constitutes the resistive element of a potentiometer 25 having a variable tap 26. The variable tap 26 is connected as one input to a meter 27 the other input of which is connected to ground. The outputs of meters 7 and 27 may be simultaneously recorded on a common recorder 28.

The circuit comprising resistors 14, 16, 17, 18, 19 and 24 constitutes a conventional loaded potentiometer circuit for dividing the voltage proportional to the square root of KE by the square root of the counting rate per volts conversion factor R. The circuit is designed in a straight-forward manner, in accordance with conventional practice, similar to that described in "Electronic Instruments" by Ivan A. Greenwood, Jr., J. Vance Holdam, Jr., and Duncan MacRae, Jr., pages 95–104 (McGraw-Hill Book Company, New York, First Edition, 1948). As indicated above, if the sensitivity of the integrator circuit 3 were fixed, then the voltage on lead 13, proportional to the square root of KE, could be divided by any fixed value so long as the meter 27 were appropriately calibrated, since with fixed values in the integrating circuit, the conversion factor is a constant. However, where the integrator circuit 3 has a variable sensitivity, the conversion factor R is a function of the variable sensitivity and the square root of R must be related to the sensitivity of the circuit 3 in order to produce an analogous indication of standard deviation. As an example of the relationship between the sensitivity of the circuit 3 and the square root of the factor R, assume that a counting rate of 166.66 counts per second is encountered and a first value of voltage E of 5 volts is developed. Movement of the slidewire connection 8 varies the output voltage E; but since the counting rate remains constant the standard deviation must also remain constant since standard deviation varies only with counting rate and as such is related to the voltage which is chosen to represent this counting rate by the counting rate per volt conversion factor R. Therefore, the circuit comprising resistors 14 and 16 through 19 must be adjusted along with the slidewire connection 8 so that the voltage output to the meter 27 varies with the factor R for a given counting rate. The voltage appearing on lead 23 is therefore $$k_2\sqrt{KE}/\sqrt{R}$$

where $k_2$ is a proportionality constant; and the voltage appearing at tap 26 is $k_3\sqrt{KE}/\sqrt{R}$ or $k_4\sqrt{E}/\sqrt{R}$ where $k_3$ and $k_4$ are proportionality constants.

By means of the circuit of the invention, the tap 22 and the slidewire connection 8 are ganged so that any variation of sensitivity produced by changing slidewire connection 8 produces a corresponding change in the function of the square root of R, and therefore, standard deviation as measured by the meter 27 remains fixed so long as the counting rate remains the same.

The circuit of the present invention may measure standard deviation, 95% confidence limits or any other desired limits depending upon the setting of the tap 26 on the resistor 24, which selects the proportionality constants $k_3$ and $k_4$. The multiplication factor K introduced by the amplifier 9 insures that the voltage across the resistor 24 is sufficiently great that the proportionality factor required for obtaining any of these aforesaid standard quantities from standard deviation may be achieved by potentiometer 25. When measuring 95% confidence limits, the standard deviation is multiplied by 1.96 and in this case the factor introduced by the resistor 24 and tap 26 must be equal to 1.96.

It can be seen from above that the circuit of the present invention provides a system for deriving a voltage indicative of standard deviation and related confidence limits from a voltage generated by a variable sensitivity counting rate meter while employing a minimal number of relatively inexpensive, readily available components.

As indicated above, when the signal E exceeds the confidence limits selected, it is likely that there has been a change in the average rate at which the measured events are occuring rather than a mere statistical variation. In measuring the rate of occurrence of the events it is desirable to smooth out the statistical variations while responding rapidly to the changes in the average rate. Smoothing out the statistical variations is accomplished by using an integrating circuit with a long time constant; whereas to respond promptly to the changes in the average there must be a short time constant. It is old in the art to provide means for switching time constants when the variations in signal exceed a fixed amount, in order that the large changes indicative of changes in average rate may be applied to a short time constant whereby the indicating and recording apparatus may respond promptly to such changes while smoothing out statistical variations when the variations do not exceed the fixed amount. The use of a fixed reference is unsatisfactory for the reason that the statistical variations vary as the square root of the number of events being measured and hence the fixed reference bears no relation to the extent of the statistical variations. By use of the computer 10 above described, it is possible to provide a variable reference related to the confidence limits, and hence to the expected statistical variations, to provide a reference for determining which variations and signals are statistical and which are changes in the average rate, thereby determining when to switch time constants to make the most accurate measurement.

An example of such a circuit is illustrated in FIGURE 2. In this illustration the time constant of integrating network 3 is relatively short. The output of integrating network 3 is a direct current varying relatively rapidly with counting rate. This current is applied through resistor 29 to condenser 30, resistor 29 and condenser 30 serving to lengthen the time constant of the circuit. This current charges condenser 30 to develop a more slowly varying D.C. voltage between junction 31 and reference junction 32. In normal operation, the charge from condenser 30 is transferred through resistor 33 to condenser 34, thereby charging condenser 34 with a still longer time constant to develop the voltage E, which is then passed to meter 7. At the same time the voltage E being measured and recorded is applied to the computer 10, which may be in the form illustrated in FIGURE 1. The output of computer 10 is passed through isolation network 35 across series connected resistors 36 and 37, the junction of resistors 36 and 37 being connected to junction 31. This provides two additional paths for the transfer of charge from condenser 30 at junction 31 to condenser 34 at junction 38. One additional path is through resistor 36 and diode 39, and the other is through resistor 37 and diode 40. The diodes are oppositely poled so that current flows from junction 31 to junction 38 through diode 39 and from junction 38 to junction 31 through diode 40. The diodes are biased by the voltage across resistors 36 and 37 so as to be normally non-conducting. Voltage is developed across resistors 36 and 37 by computer 10 through isolation circuit 35. Isolation circuit 35 serves merely to isolate computer 10 from resistors 36 and 37 so that the voltages applied to resistors 36 and 37 may be floating, that is, not tied to any reference junction of computer 10 which is tied to junction 32; this permits resistors 36 and 37 to be connected to the junction 31 while avoiding additional current paths from junction 31 to junction 32 through computer 10.

Isolation circuit 35 may be any conventional isolation circuit and most particularly may be the circuit illustrated in FIGURE 3. The output of computer 10 is applied to control grid 41 of D.C. amplifying tube 42, connected in a conventional manner with cathode resistor 43 and load resistor 44. The output of amplifier tube 42 is applied through conductor 45 to winding 46 of a three-winding RF choke 47 which also includes windings 48 and 49. Winding 48 is connected to the grid 50 of tube 51 to comprise a conventional RF oscillator, the output of which is furnished on winding 49, rectified by diode 52, smoothed by capacitor 53 and applied across resistors 36 and 37. In operation the output of computer 10 is amplified by amplifier 42 and used to control the amplitude of the output of the RF oscillator. After rectification and smoothing, the D.C. voltage applied to resistors 36 and 37 is proportional to the applied signal from the computer 10. Isolation is effected by the transformer coupling to winding 49. There is no D.C. connection between the resistor 36—37 network and the ground reference of computer 10.

Preferably, diodes 39 and 40 are identical, and resistors 36 and 37 are identical. In this case the voltages derived on resistors 36 and 37 are equal and oppositely poled. Adjustment of tap 26 determines the voltage derived on resistors 36 and 37. The voltages derived on resistors 36 and 37 therefore relate to the desired confidence limits as selected by positioning tap 26. These voltages are poled to provide reverse bias for diodes 39 and 40 and act as reference voltages for by-passing resistor 33 either through diode 39 or through diode 40. Under normal operating conditions, with variations remaining within the confidence limits, the voltage changes on condenser 30 are applied slowly through resistor 33 to condenser 34. When the change in voltage rises beyond the upper confidence limit, the reverse bias provided by resistor 36 is overcome, and charge is promptly transferred through diode 39 to condenser 34. When the relative voltage at junction 31 drops below the lower confidence limit, the reverse bias provided by resistor 37 is overcome, and charge is transferred promptly from condenser 34 through diode 40 to condenser 30. In either case, when there are large variations in signal, the circuit responds promptly, and meter 7 records the new voltage promptly. However, when the changes are small, that is, principally statistical, the charge is transferred slowly to condenser 34 through condenser 33, and the meter responds sluggishly.

It is to be understood that this invention is not limited to the specific circuits and applications illustrated but is limited only by the following claims.

What I claim is:

1. In a system having means for developing electric pulses at a rate depending upon the rate of occurrence of observed events, the improvement comprising means for integrating said pulses with a predetermined time constant to produce a first voltage, means connected to said means for integrating for producing a second voltage proportional to the square root of said first voltage, and means for converting said second voltage to a third voltage proportional to the square root of the number of observed events per unit time.

2. In a system having means for developing electric pulses at a rate depending upon the rate of occurrence of observed events having a Poisson distribution, the improvement comprising means for integrating said pulses with a predetermined time constant to produce a first voltage, means connected to said means for integrating for producing a second voltage proportional to the square root of said first voltage, and means for converting said second voltage to a third voltage proportional to the square root of the number of observed events per unit time, means for varying the sensitivity of said means for integrating, and means for maintaining said third voltage constant so long as said number of events per unit time remains constant.

3. In a system having means for developing electric pulses of equal energy content at a rate determined by the rate of occurrence of observed events having a Poisson distribution, the improvement comprising means for integrating said pulses with a predetermined time constant to produce a first voltage, means for varying the counting rate sensitivity of said means for integrating, means connected to said means for integrating for producing a second voltage having a value proportional to the square root of said first voltage, means for dividing said second voltage by a variable factor proportional to the square root of the ratio of the counting rate input to the voltage output of said means for integrating, and means for varying said variable factor as the square root of the variation in counting rate sensitivity.

4. In a system having means for developing electric pulses of equal energy content at a rate determined by the rate of occurrence of observed events, the improvement comprising means for integrating said pulses over a predetermined time constant to produce a first voltage, potentiometer means for varying the sensitivity of said means for integrating, means connected to said means for integrating for producing a second voltage having a value proportional to the square root of said first voltage, means for dividing said second voltage by a variable factor proportional to the square root of the ratio of the counting rate input to the voltage output of said means for integrating, and means for varying the square of said variable factor linearly with the variation in said potentiometer means.

5. In apparatus for measuring the rate of occurrence of observed events, the average rate of which varies and is superimposed by random statistical variations in rate, including means for developing electrical pulses at a rate depending upon the rate of occurrence of said observed events, and means for integrating said electrical pulses to produce a first voltage systematically related to the rate of occurrence of said pulses, the improvement comprising means for establishing confidence limits of the measurements dependent upon the rate of occurrence of the observed events and utilizing these limits to control the time constant with which the electrical pulses are integrated to produce said first voltage, said improvement including means for deriving a second voltage proportional to the square root of the number of observed events per unit time, and means connected both to said means for deriving a second voltage and to said means for integrating for decreasing the time constant of said integrating means whenever said first voltage varies from its recent average value by more than said second voltage, whereby statistical variations are smoothed out by integrating at a relatively long time constant while variations of the average value are more promptly appreciated by integrating at a shorter time constant.

6. In apparatus for measuring the rate of occurrence of observed events following a Poisson distribution, the average rate of which varies and is superimposed by random statistical variations in rate, including means for developing electrical pulses at a rate depending upon the rate of occurrence of said observed events, and means for integrating said electrical pulses to produce a first voltage systematically related to the rate of occurrence of said pulses, the improvement comprising means for establishing confidence limits of the measurements dependent upon the rate of occurrence of the observed events and utilizing these limits to control the time constant with which the electrical pulses are integrated, said improvement including means for deriving a second voltage proportional to the square root of the number of observed events per unit time, capacitance means, resistance means, means connected to said means for integrating for applying said first voltage to said capacitance means through said resistance means, and means connected both to said means for deriving a second voltage and to said resistance means for by-passing said resistance means whenever said first voltage varies from the voltage on said capacitance means by more than said second voltage, whereby statistical variations are smoothed out by integrating at a relatively long time constant while variations of the average value are more promptly appreciated by integrating at a shorter time constant.

7. In apparatus for measuring the rate of occurence of observed events, the average rate of which varies and is superimposed by random statistical variations in rate, including means for developing electrical pulses at a rate depending upon the rate of occurrence of said observed events, and means for integrating said electrical pulses to produce a first voltage systematically related to the rate of occurrence of said pulses, the improvement comprising means for establishing confidence limits of the measurements dependent upon the rate of occurrence of the observed events and utilizing these limits to control the time constant with which the electrical pulses are integrated, said improvement including means for deriving second and third voltages proportional to the square root of the number of observed events per unit time, capacitance means, resistance means, means connected to said means for integrating for applying said first voltage to said capacitance means through said resistance means, a first rectifier means connected to said means for deriving in series with said second voltage poled to by-pass said resistance means whenever said first voltage exceeds the voltage on said capacitance means by more than said second voltage, and a second rectifier means connected to said means for deriving in series with said third voltage poled to by-pass said resistance means whenever the voltage on said capacitance means exceeds said first voltage by more than said third voltage, whereby statistical variations are smoothed out by integrating at a relatively long time constant while variations of the average value are more promptly appreciated by integrating at a shorter time constant.

References Cited in the file of this patent

UNITED STATES PATENTS

| | | |
|---|---|---|
| 2,623,927 | Germans | Dec. 30, 1952 |
| 2,665,385 | Herzog | Jan. 5, 1954 |
| 2,750,110 | Och | June 12, 1956 |
| 2,767,914 | Merrill et al. | Oct. 23, 1956 |

UNITED STATES PATENT OFFICE
CERTIFICATE OF CORRECTION

Patent No. 3,072,335                        January 8, 1963

Elton Floyd Neil Harper

It is hereby certified that error appears in the above numbered patent requiring correction and that the said Letters Patent should read as corrected below.

Column 1, line 54, strike out "of"; column 2, line 69, for "mounting" read -- counting --.

Signed and sealed this 27th day of August 1963.

(SEAL)
Attest:

ERNEST W. SWIDER                      DAVID L. LADD
Attesting Officer                       Commissioner of Patents